United States Patent [19]

Mizutani

[11] Patent Number: 4,969,107

[45] Date of Patent: Nov. 6, 1990

[54] APPARATUS AND METHOD FOR ADJUSTING POSITION OF AN INDUSTRIAL ROBOT

[75] Inventor: Akihiro Mizutani, Tokyo, Japan

[73] Assignee: Fuji Jukogyo Kabushiki Kaisha, Tokyo, Japan

[21] Appl. No.: 340,524

[22] Filed: Apr. 19, 1989

[30] Foreign Application Priority Data

Apr. 26, 1988 [JP] Japan .................. 63-102932

[51] Int. Cl.$^5$ .............................. G05B 19/00
[52] U.S. Cl. .............................. 364/513; 219/124.34; 901/47
[58] Field of Search ............... 364/513; 219/121.78, 219/121.79, 121.8, 121.81, 124.34; 901/47

[56] References Cited

U.S. PATENT DOCUMENTS

| | | | |
|---|---|---|---|
| 3,426,174 | 2/1969 | Graham et al. | 219/124.34 |
| 3,609,288 | 9/1971 | Sciaky | 219/124.34 |
| 4,012,620 | 3/1977 | Sciaky | 219/124.34 |
| 4,413,910 | 11/1983 | Cornu et al. | 219/124.34 |

*Primary Examiner*—Allen MacDonald
*Attorney, Agent, or Firm*—Beveridge, DeGrandi & Weilacher

[57] ABSTRACT

An industrial robot for drilling is provided with a robot arm to which a working unit is mounted. An apparatus for adjusting the position of the industrial robot comprises a laser beam emitting unit secured to the working unit and a laser beam receiving unit for receiving a laser beam emitted from the emitting unit. A reflecting material is disposed on a working portion of a workpiece to be worked. The laser beam is emitted from the light emitting unit towards a working portion of the workpiece and the laser beam is reflected by the reflecting material on the workpiece. The reflected light beam is received by the light receiving unit. The light receiving unit comprises a plurality of light receiving elements including one reference light receiving element. The position of the industrial robot is adjusted by the light receiving unit until the working unit is displaced to the portion at which the reflected laser beam is finally received by the reference light receiving element.

7 Claims, 2 Drawing Sheets

APPARATUS AND METHOD FOR ADJUSTING POSITION OF AN INDUSTRIAL ROBOT

BACKGROUND OF THE INVENTION

The present invention relates to an apparatus and a method for adjusting a minute positional displacement or error between a working unit which is mounted to an industrial robot and a workpiece.

Recently, there have been provided many kinds of industrial robots, and there is known the industrial robot provided with the working unit for carrying out arc welding operation or drilling operation. For example, the Japanese Patent Laid-open No. 62-183969 discloses an arc welding robot which is provided with a welding position detecting device. The welding position detecting device of this type generally includes an irradiation optical unit and an observation optical unit for adjusting the focus position of the observation optical unit by detecting the position and the amount of a scattered light obtained by irradiating a light beam on a reference surface.

According to the welding position detecting device of the type described above, a position of a welding line along which a welding operation is carried out, is detected by irradiating the light beam having a different wave length from that of a sectorially converging light on the optical axis of the converged light. A position of a welding torch is controlled in accordance with detected results. Accordingly, it becomes difficult to adjust the minute positional errors or displacements between the welding torch and the workpiece.

SUMMARY OF THE INVENTION

An object of the present invention is to eliminate defects of the conventional technique described above and to provide an apparatus and method for adjusting a position of an industrial robot to adjust a displacement between a workpiece and a working unit mounted to the industrial robot so as to perform an exact working operation.

One aspect according to the present invention is to provide an apparatus for adjusting a position of an industrial robot provided with a robot arm to which a working unit is mounted. The apparatus comprises a light emitting unit secured to the working unit for emitting a laser beam towards a working portion of a workpiece to be worked. A reflector is disposed on a working portion for reflecting the laser beam emitted from the light beam emitting unit and a light receiving unit attached to the working unit for receiving the laser beam reflected by the reflector. The light receiving unit comprises a plurality of light receiving elements including a reference light receiving element and a controlling unit operatively connected to the light receiving unit for displacing the robot arm together with the working unit. As a result, the laser beam emitted from the light beam emitting unit is finally received by the reference light receiving element of the light receiving unit.

In another aspect according to the present invention, there is provided a method for adjusting a position of an industrial robot provided with a robot arm to which a working unit is mounted on a position adjusting apparatus. This apparatus comprises a light emitting unit secured to the working unit and a light receiving unit secured to the working unit. The method comprises the steps of preparing a workpiece to be worked by the working unit, emitting the laser beam from the light emitting unit towards a working portion of the workpiece, receiving the laser beam reflected from the workpiece, deciding a position of the light receiving unit at which the reflected laser beam is received, performing a displacement between the portion at which the reflected laser beam is received and a reference portion of the light receiving unit, displacing the location of the robot arm in accordance with the displacement, and adjusting the position of the working unit together with the light emitting unit and with the displacement of the robot arm. As a result, the laser beam emitted from the light emitting unit is finally received by the reference position of the light receiving unit.

According to the present invention having the character described above, the laser beam from the laser beam emitting unit is emitted towards the reflecting material disposed on the working portion of a workpiece. The laser beam reflected by the reflecting material is received by the laser beam receiving unit which comprises a plurality of laser beam receiving elements including one reference receiving element. A signal is transmitted from the laser beam receiving element actually receiving the laser beam to the controlling unit when the reflected laser beam is received by the laser beam receiving unit other than the reference receiving element. The working unit of the industrial robot is displaced by the controlling unit until the laser beam emitted from the laser beam emitting unit is finally received by the reference laser beam receiving element. When the laser beam receiving element actually receives the reflected laser beam of the reference laser beam, the working unit is located at a suitable position with respect to the workpiece to be worked. Thus the adjustment of the industrial robot is exactly performed.

The preferred embodiments according to the present invention will be described in further detail hereinafter, with reference to the accompanying drawings.

DESCRIPTION OF THE PREFERRED EMBODIMENT

Figure 1:
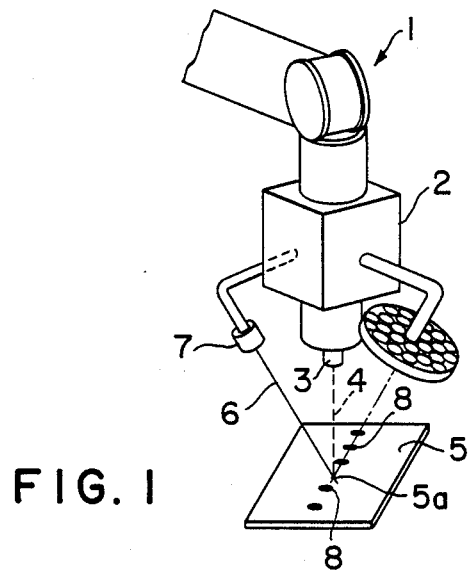
FIG. 1 is a schematic perspective view of an apparatus for adjusting a position of an industrial robot according to the present invention.
Figure 3:
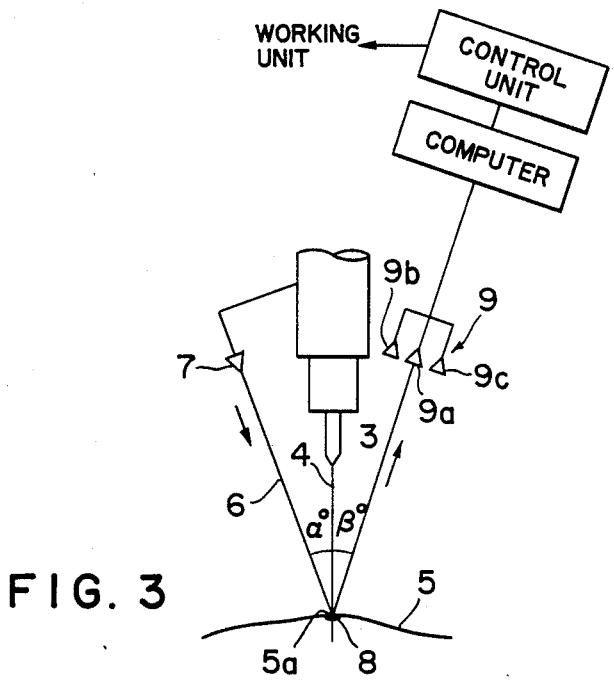
FIG. 3 is an illustration showing working steps according to the apparatus shown in FIG. 1.

Referring to FIG. 1, an industrial robot arm is designated by reference numeral 1, and to the robot arm 1 is mounted a working unit 2 such as a drilling unit. A light emitting unit 7 is attached to the working unit 2 for emitting a laser (light) beam 6 towards a working portion 5a of a work 5 at an incident angle of $\alpha$ with respect to an axis 4 of a drill 3 as shown in FIG. 3. A plurality of painted mark spots 8 each consisting of material having property of reflecting the laser beam 6 are arranged on the working portions 5a of the work 5.

A light receiving unit 9 is further attached to the working unit 2 and the location of the light receiving unit 9 is adjusted so as to receive the light reflected the spots 8 at an angle of $\beta$ with respect to the axis 4. The light receiving unit 9 is provided with a plurality of light receiving elements 9a, 9b, 9c, —and one of these light receiving elements, for example 9a, is set as a reference light receiving element.

As shown in FIG. 3, in the positional relationship, the light emitting unit 7, the working portion 5a and the light receiving element 9a of the light receiving unit 9 are positioned at vertexes of a triangle. Accordingly, when the laser beam 6 is irradiated from the light emitting unit 7 and received by the light receiving element 9a, the working portion 5a of the work 5 is positioned on axis 4 of the drill 3.

Figure 2:
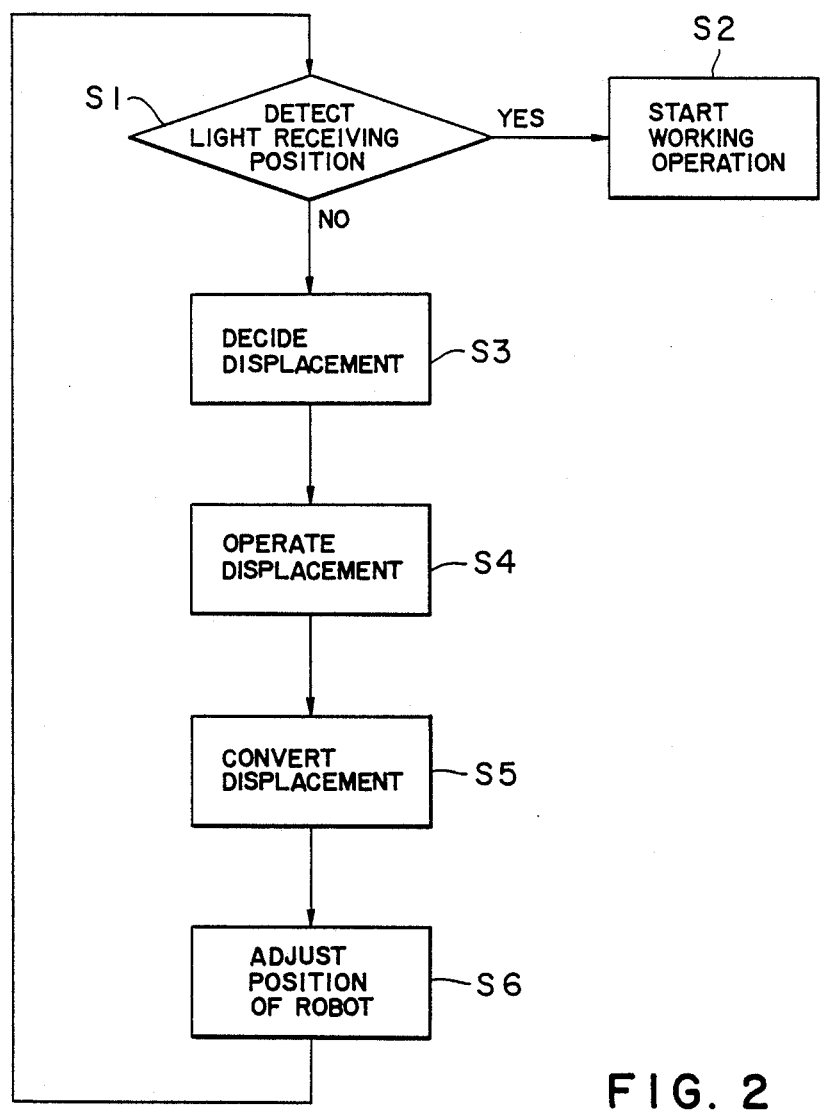
FIG. 2 is a flowchart showing sequences of controlling the position of the industrial robot according to a method of the present invention.

The respective light receiving elements 9a, 9b, 9c, —are connected to a computer. The operation of the working unit 2 by the computer is described hereinafter with reference to the flowchart shown in FIG. 2.

At a first step S1, the computer detects a signal representing whether or not the laser beam 6 reflected by the reflector 8 is received by the light receiving element 9a. *The working operation of the working unit 2 starts (Step S2) when the computer detects the signal from the light receiving element 9a* for deciding that the laser beam 6 reflected by the reflector 8 (the painted mark spot) is received by the light receiving element 9a. On the other hand, if it is decided that the signal received by the computer is not transmitted from the light receiving element 9a and transmitted from the other light receiving element 9b, the computer operates the displacement between the light receiving elements 9a and 9b (Step S3). A signal representing the operated result is transmitted to a controlling unit to operate the displacement of the robot (Step S4). The signal is converted to the displacements along respective axes of the robot to be adjusted and the location of the robot is adjusted to a suitable position (Steps S5 and S6). Once these Steps from S1 to S6 have been completed, these steps are repeated until the computer detects a signal representing that the laser beam 6 is received by the light receiving element 9a. The working unit 2 commences performing the working operation when the computer confirms this fact.

Hereinafter, there will be described an example in which the apparatus according to the present invention is applied to drill parts or members of an airplane.

The member of the airplane to be worked is designated by reference numeral 5 in FIG. 1. The laser beam reflector 8 is first located at the position of the member 5 to be drilled. The drilling unit 2 mounted to the robot arm 1 is moved so that the drill 3 is located at a position directly above the laser beam reflector 8. Then, the light emitting unit 7 emits the laser beam 6 towards the laser beam reflector 8 on the member 5 and the reflected light is received by either one of the light receiving elements 9a, 9b, 9c, - - - of the light receiving unit 9. The light received by the light receiving elements 9a, 9b, 9c, - - - is converted into a signal which is then transmitted therefrom to the computer. The computer calculates the displacement from the reference light receiving element 9a when the computer decides the fact that the signal from the light receiving unit 9 is not directly from the light receiving element 9a as a reference element. A signal representing the calculated displacement is then transmitted to the control unit to move the drill 3 of the drilling unit 2 mounted on the robot arm 1 by an amount required for correction. The light emitting unit 7 is also displaced by the same amount as that of the displacement of the drilling unit 2. The light emitting unit 7 again emits the laser beam 6 from the displaced position towards the laser beam reflector 8 on the member 5 and the light reflected therefrom is received by one of the light receiving elements 9a, 9b, 9c. These operations are repeated until the laser beam 6 is finally received by the reference light receiving element 9a. Since the vertexes of the triangle are the light emitting unit 7, the portion 5a to be worked on the member 5 and the light receiving element 9a. The working position 5a is disposed on the axis 4 of the drill 3 when the laser beam 6 from the light emitting unit 7 is finally received by the reference light receiving element 9a of the light receiving unit 9. The drilling operation is started when this positional relationship is established.

According to the present invention, exact correction of minute location error between each working unit of the robot and the workpiece is achieved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An apparatus for adjusting a position of an industrial robot provided with a robot arm to which a working unit is mounted, comprising:
   light beam emitting means secured to said working unit for emitting light beam towards a working portion of a workpiece to be worked;
   reflecting means disposed on the working portion for reflecting the light beam emitted from said light beam emitting means;
   light receiving means attached to said working unit for receiving the light beam reflected by said reflecting means, said light receiving unit comprising a plurality of light receiving elements including one reference light receiving element;
   deciding means for positioning said light receiving means and for calculating a displacement between said light receiving means and said reflecting means; and
   displacing means connected to said light receiving unit for displacing said working unit so that the light beam is finally received by said reference light receiving element of said light receiving means.

2. The apparatus according to claim 1, wherein said light emitting means emits a laser beam.

3. The apparatus according to claim 1, wherein said light reflecting means is a painting material having a light reflecting property.

4. The apparatus according to claim 1, wherein said working unit is a drilling unit.

5. A method for correcting a position of an industrial robot provided with a robot arm to which a working unit is mounted to use a position adjusting apparatus comprising light emitting means secured to the working unit and light receiving means secured to the working unit, said method comprising the steps of:
   preparing a workpiece to be worked on the working unit;
   emitting a light beam from said light emitting means towards a working portion of the workpiece;
   receiving a light beam reflected from the workpiece;
   deciding a position of said light receiving means at which the reflected light beam is received;
   calculating a displacement between the position at which the reflected light beam is received and a reference position of the light receiving means;
   displacing the location of the robot arm in dependency on the calculated displacement; and adjusting the position of the working unit together with the light emitting means and with the displacement of the robot arm so that the light beam is finally received by the reference position of the light receiving means.

6. The method according to claim 5, wherein said light emitting means emits a laser beam.

7. The method according to claim 5, wherein said light reflecting means is a painting material having a light reflecting property.

* * * * *